(No Model.)
J. W. FRY.
BICYCLE SUPPORT.
No. 292,163. Patented Jan. 22, 1884.
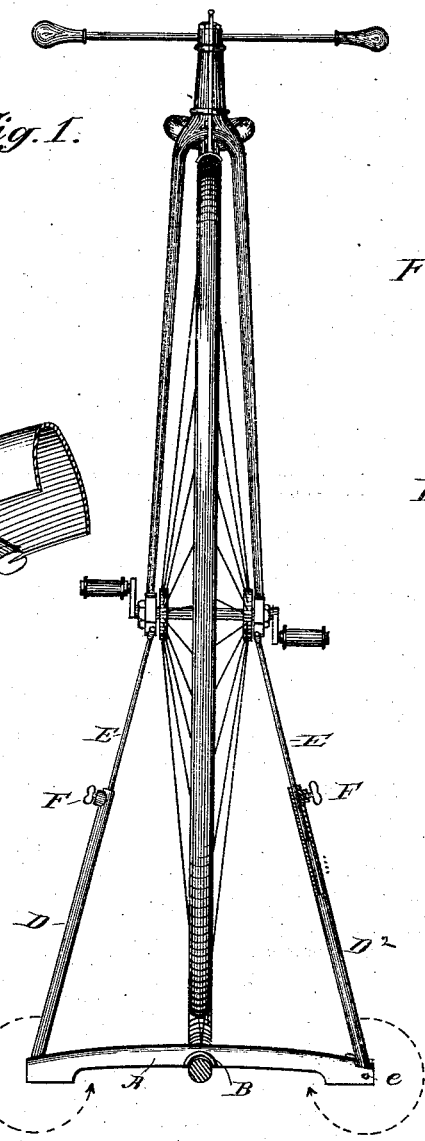
Witnesses
A. W. Steiger
G. M. Woodcock
Inventor:
John W. Fry
By David A. Burr
Attorney.

UNITED STATES PATENT OFFICE.

JOHN W. FRY, OF NEW YORK, N. Y.

BICYCLE-SUPPORT.

SPECIFICATION forming part of Letters Patent No. 292,163, dated January 22, 1884.

Application filed November 13, 1883. (No model.)

*To all whom it may concern:*

Be it known that I, JOHN W. FRY, of the city, county, and State of New York, have invented a new and useful Improvement in Bicycle-Supports; and I do hereby declare that the following is a full and exact description thereof, reference being had to the accompanying drawings, and to the letters of reference marked thereon, making a part of this specification.

My invention relates to a portable support for bicycles; and it consists in a semi-tubular base-piece transversely notched in the center on its under side to fit upon the rim of the wheel, and to whose ends are pivoted telescopic rods adapted to close and fold inward into the recess of the base-piece, and when opened out to extend up and embrace with their outer ends the hub of the wheel, the object of my improvement being to furnish a light, neat, portable support adapted to be quickly adjusted for the support of the wheel in its upright position.

In the accompanying drawings, Figure 1 is a front view of a bicycle upheld by my improved support, the rim of the wheel being cut in section to illustrate the notch in the base-piece of the support. Fig. 2 is an elevation of the support when folded up; Fig. 3, a view in perspective of one end of the base-piece on an enlarged scale, illustrating the pivotal attachment of the supporting-rod thereto and the hook for locking it; Fig. 4, a similar view of the crutch adapted to embrace the hub, and Fig. 5 a detached perspective view on an enlarged scale of the central portion of the base-piece, illustrating the combination of a rubber lining with the edge of the notches therein.

A represents a semi-tubular metallic base-piece of suitable length to afford a proper transverse base for the support of the wheel. The edges of this base-piece, forming its under side, are notched transversely in the middle of its length, as at B, to fit over the rim or felly of the wheel, and the edge of each notch is lined by slitting a bit of thick rubber cord, C, lengthwise, and causing the slit to embrace or bite the edge of the notch, as illustrated in Fig. 3 of the drawings. The two ends of the base-piece are each slotted on its upper arched side to embrace the inner end of a light tubular rod, D, which is pivoted within the slot against one side thereof by means of a transverse pin, e, (see Fig. 4,) so as to be free to swing freely therein in a plane parallel with the length of the base-piece, and thus to fold inward into the longitudinal recess or groove upon its under side and outward over its upper side to an angle of forty-five degrees (more or less) with a line perpendicular to the center of said upper side. The slots within which the rods D are thus pivoted are cut, respectively, on opposite sides of the longitudinal axis of the base-piece.

Within each pivoted tubular rod D is fitted a second rod or crutch, E, adapted to slide freely in and out of the same, to constitute an extension thereto, this extension-rod being firmly fixed, when drawn out to the desired length, by means of a set-screw, F, led through the side of the rod to engage it. The upper or outer end of the rod or crutch E is adapted to fit under and partially embrace the end of the hub, and is covered with rubber or other soft material to cushion its contact with the hub. (See Fig. 4.) One of the telescopic supporting-arms D, when swung up from the base-piece to engage the hub, is locked by means of a hook, H, (see Fig. 3,) pivoted to the upper side of the end of the base-plate.

In fitting the support to the wheel, the wheel being chained or locked in the usual manner, the telescopic rods are adjusted to a proper length and fixed by the set-screws F. The lock-rod D is then swung out and locked by the hook H, (see Fig. 3,) and while the wheel is upheld by one hand this locked rod is inserted between the spokes of the wheel to bring its crutch into engagement on the opposite side with the hub and the base-piece into contact with the ground at right angles with the wheel, the rim of the wheel being spanned by the notch in the base-piece, as illustrated in Fig. 1. The crutch on the second rod D is now swung around into position under the opposite end of the hub, completing the support of the wheel. The base-piece A, thus secured upon the ground transversely to the wheel and engaging its hub, will afford a firm base of support, and serve to uphold the wheel securely in an upright position.

When the support is not in use, it is readily stowed away in small compass by loosening the set-screw, sliding the upper crutch-rod of each arm down into the lower tube, and, after withdrawing the hook H, swinging each arm upon its pivot into the longitudinal groove or recess on the under side of the base-piece, so as that they shall both be fully inclosed and concealed therein in a very small compass, as shown in Fig. 2.

I claim as my invention—

The improved bicycle-support, constructed of a base-piece transversely notched or curved in the middle to embrace or span the felly of the wheel, and provided with extension-rods pivoted to each end of the base-piece to swing inward into line parallel therewith, and outward to converge toward each other above the base-piece, and engage the hub of the wheel, substantially in the manner and for the purpose herein set forth.

In testimony whereof I have signed my name to this specification in the presence of two subscribing witnesses.

JOHN W. FRY.

Witnesses:
G. H. SPENCER,
A. W. STEIGER.